United States Patent
Stone et al.

(10) Patent No.: US 10,570,741 B2
(45) Date of Patent: Feb. 25, 2020

(54) METHOD OF BALANCING A GAS TURBINE ENGINE ROTOR

(71) Applicant: Pratt & Whitney Canada Corp., Longueuil (CA)

(72) Inventors: Paul Stone, Guelph (CA); Richard Ivakitch, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 281 days.

(21) Appl. No.: 15/484,425

(22) Filed: Apr. 11, 2017

(65) Prior Publication Data

US 2017/0218767 A1 Aug. 3, 2017

Related U.S. Application Data

(62) Division of application No. 14/531,438, filed on Nov. 3, 2014, now Pat. No. 9,638,037.

(51) Int. Cl.

| *F01D 5/02* | (2006.01) |
| *G01M 1/30* | (2006.01) |
| *G01M 1/34* | (2006.01) |
| *G01M 1/32* | (2006.01) |
| *G01M 1/36* | (2006.01) |
| *F04D 29/32* | (2006.01) |
| *F04D 29/66* | (2006.01) |

(52) U.S. Cl.
CPC ........... *F01D 5/027* (2013.01); *F04D 29/321* (2013.01); *F04D 29/325* (2013.01); *F04D 29/662* (2013.01); *G01M 1/30* (2013.01); *G01M 1/32* (2013.01); *G01M 1/34* (2013.01); *G01M 1/36* (2013.01); *F05D 2220/32* (2013.01); *F05D 2230/10* (2013.01)

(58) Field of Classification Search
CPC ........... F01D 5/027; G01M 1/30; G01M 1/32; G01M 1/34; G01M 1/36
See application file for complete search history.

(56) References Cited

U.S. PATENT DOCUMENTS

| 2,684,036 A | 7/1954 | Stratveit |
| 4,043,147 A | 8/1977 | Wiebe |
| 4,294,135 A | 10/1981 | Tameo |
| 4,784,012 A * | 11/1988 | Marra ..................... F01D 5/027 415/119 |

(Continued)

FOREIGN PATENT DOCUMENTS

DE     102006027723 A1     1/2007

*Primary Examiner* — Dwayne J White
*Assistant Examiner* — Behnoush Haghighian
(74) *Attorney, Agent, or Firm* — Norton Rose Fulbright Canada L.L.P.

(57) ABSTRACT

A gas turbine engine rotor including a disc adapted to be mounted for rotation about an axis, the disc including an annular balancing flange integrally connected thereto, the balancing flange having a first radial dimension around a first arc angle and a second radial dimension greater than the first radial dimension around a second arc angle, the second arc angle corresponding to 360 minus the first arc angle, the second arc angle being less than 180 degrees, the balancing flange around the second arc angle defining a protuberance, the protuberance being defined through machining of the balancing flange, the protuberance compensating for an unbalance of the rotor.

12 Claims, 8 Drawing Sheets

(56) References Cited

U.S. PATENT DOCUMENTS

| | | | |
|---|---|---|---|
| 4,835,827 A * | 6/1989 | Marra | F01D 5/027 29/407.01 |
| 4,926,710 A | 5/1990 | Novotny | |
| 5,011,374 A | 4/1991 | Miller | |
| 5,582,077 A * | 12/1996 | Agram | F01D 5/027 403/318 |
| 6,234,912 B1 | 5/2001 | Koschier et al. | |
| 6,354,780 B1 | 3/2002 | Davis et al. | |
| 6,588,298 B2 | 7/2003 | Czerniak et al. | |
| 7,069,654 B2 | 7/2006 | Robbins | |
| 7,296,976 B2 * | 11/2007 | Roever | F01D 5/027 416/144 |
| 7,303,377 B2 | 12/2007 | Rockarts et al. | |
| 7,445,433 B2 | 11/2008 | Chivers et al. | |
| 7,793,540 B2 | 9/2010 | Robbins | |
| 8,122,785 B2 * | 2/2012 | Czerniak | F01D 5/027 73/470 |
| 8,186,961 B2 | 5/2012 | Stone | |
| 8,215,910 B2 | 7/2012 | Belmonte et al. | |
| 9,511,457 B2 * | 12/2016 | Stone | F01D 5/027 |
| 2003/0213334 A1 * | 11/2003 | Czerniak | F01D 5/027 416/145 |
| 2005/0231052 A1 | 10/2005 | Rockarts et al. | |
| 2006/0083619 A1 * | 4/2006 | Roever | F01D 5/027 416/145 |
| 2006/0236796 A1 | 10/2006 | Harada | |
| 2009/0087313 A1 | 4/2009 | Belmonte et al. | |
| 2010/0260605 A1 | 10/2010 | MacFarlane et al. | |
| 2010/0316496 A1 | 12/2010 | Williams et al. | |
| 2011/0027085 A1 | 2/2011 | Glasspoole et al. | |
| 2011/0044816 A1 | 2/2011 | Lecuyer et al. | |
| 2011/0078901 A1 | 4/2011 | Glasspoole et al. | |
| 2011/0296686 A1 | 12/2011 | Strother | |
| 2012/0207603 A1 | 8/2012 | Woods et al. | |
| 2012/0210579 A1 | 8/2012 | Stone | |
| 2013/0209260 A1 | 8/2013 | Stone | |
| 2016/0237825 A1 * | 8/2016 | Himes | F01D 25/06 |

* cited by examiner

METHOD OF BALANCING A GAS TURBINE ENGINE ROTOR

CROSS-REFERENCE TO RELATED APPLICATION

This application is a divisional of U.S. application Ser. No. 14/531,438, filed Nov. 3, 2014, the entire contents of which is incorporated by reference herein.

TECHNICAL FIELD

The application relates generally to gas turbine engines and, more particularly, to the balancing of rotors.

BACKGROUND OF THE ART

Gas turbine engine rotors, such as fan, compressor and turbine rotors, can be balanced by removal of material. The material removal process usually involves milling a groove into a surface of the rotor to correct the unbalance. These grooves may create high stress areas in the rotor. In addition, the portion of the rotor in which the groove is formed must typically be over dimensioned to ensure sufficient depth of material can be removed in forming the groove, which may add significant weight to the rotor.

The rotors can also be balanced through the addition of rings having a fixed geometry including eccentricities which are detachably engaged to the rotor by varying the relative angle between the rings depending on the unbalance to be corrected, or through the addition of balancing weights attached to the rotor. Both methods may also add significant weight to the rotor.

SUMMARY

In one aspect, there is provided a method of balancing a gas turbine engine rotor, the method comprising: providing a rotor having a disc and a circumferential array of blades extending radially outwardly from the disc, the disc having a balancing flange integrally connected thereto, the balancing flange being annular; measuring an unbalance of the rotor; determining a corresponding unbalance correction necessary to correct at least part of the unbalance; determining a configuration of a theoretical notch in the balancing flange that would create the unbalance correction, the configuration of the theoretical notch including a depth of the theoretical notch defined along the radial direction, an arc angle spanning a circumferential width of the theoretical notch, and a circumferential position of the theoretical notch; and creating the unbalance correction by removing material from the balancing flange to create a protuberance protruding radially relative to a remainder of the balancing flange, the protuberance having a height defined along the radial direction, the height corresponding to the depth of the theoretical notch, the protuberance having a circumferential width spanned by the arc angle of the theoretical notch, the protuberance having a circumferential position diametrically opposed to the circumferential position of the theoretical notch.

In another aspect, there is provided a method of balancing a gas turbine engine rotor, the method comprising: providing a rotor with a balancing flange integrally connected to a disc of the rotor, the balancing flange being annular; measuring an unbalance of the rotor; determining a corresponding unbalance correction necessary to correct at least part of the unbalance; axisymmetrically removing an annular portion of the balancing flange exceeding that required to provide the unbalance correction; and creating the unbalance correction by non-axisymmetrically removing material from the balancing flange.

In a further aspect, there is provided a gas turbine engine rotor comprising a disc adapted to be mounted for rotation about an axis, the disc including an annular balancing flange integrally connected thereto, the balancing flange having a first radial dimension around a first arc angle and a second radial dimension greater than the first radial dimension around a second arc angle, the second arc angle corresponding to 360 minus the first arc angle, the second arc angle being lower than 180 degrees, the balancing flange around the second arc angle defining a protuberance, the protuberance being defined through machining of the balancing flange, the protuberance compensating for an unbalance of the rotor measured prior to machining of the balancing flange.

DESCRIPTION OF THE DRAWINGS

Reference is now made to the accompanying figures in which.

DETAILED DESCRIPTION

Figure 1:
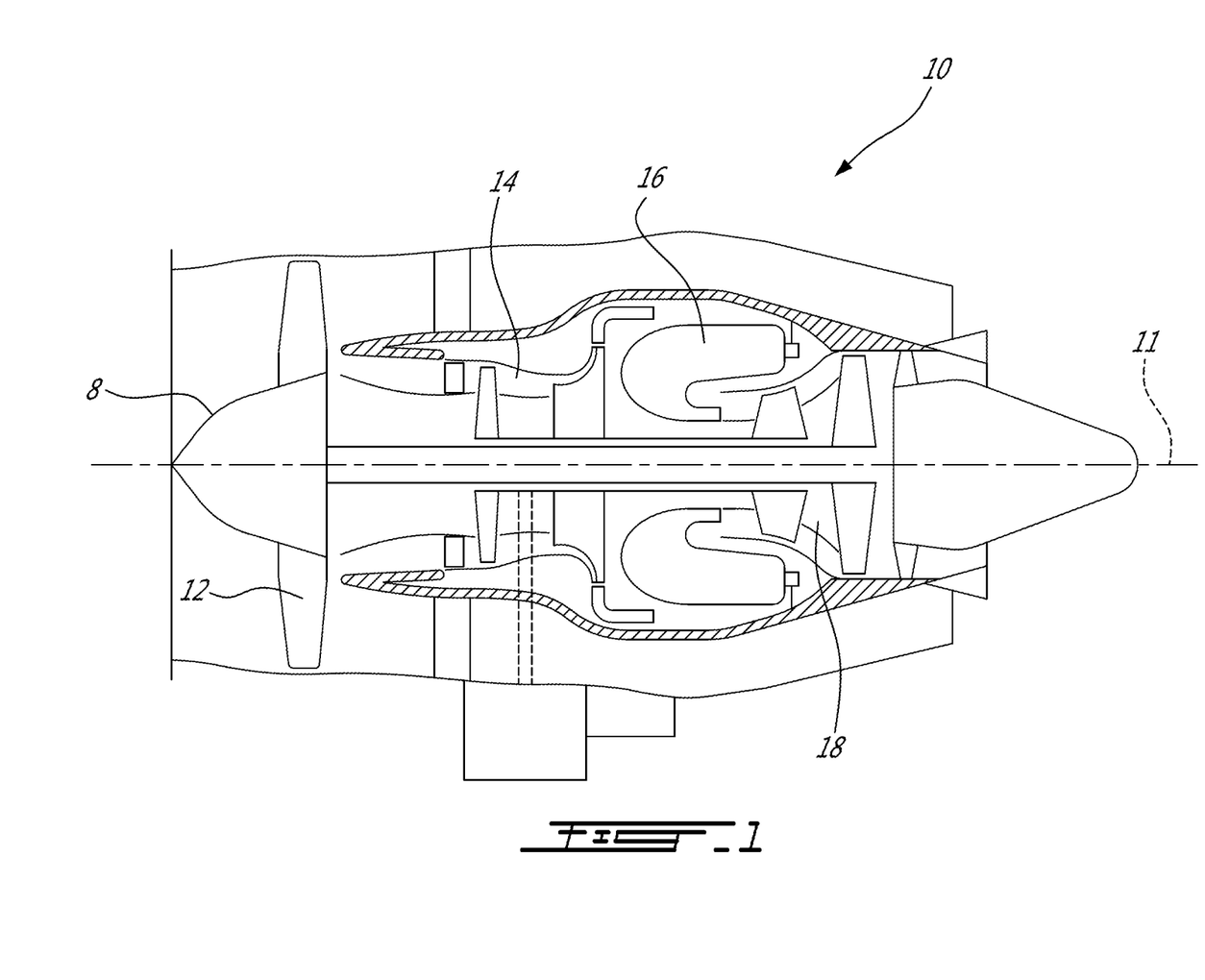
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12, the compressor section 14 and the turbine section 18 each have rotary components which need to be balanced. While the present balancing method will be hereinafter described in connection with a fan rotor, it is understood that the present balancing approach is also applicable to compressor and turbine rotors.

Figure 2:
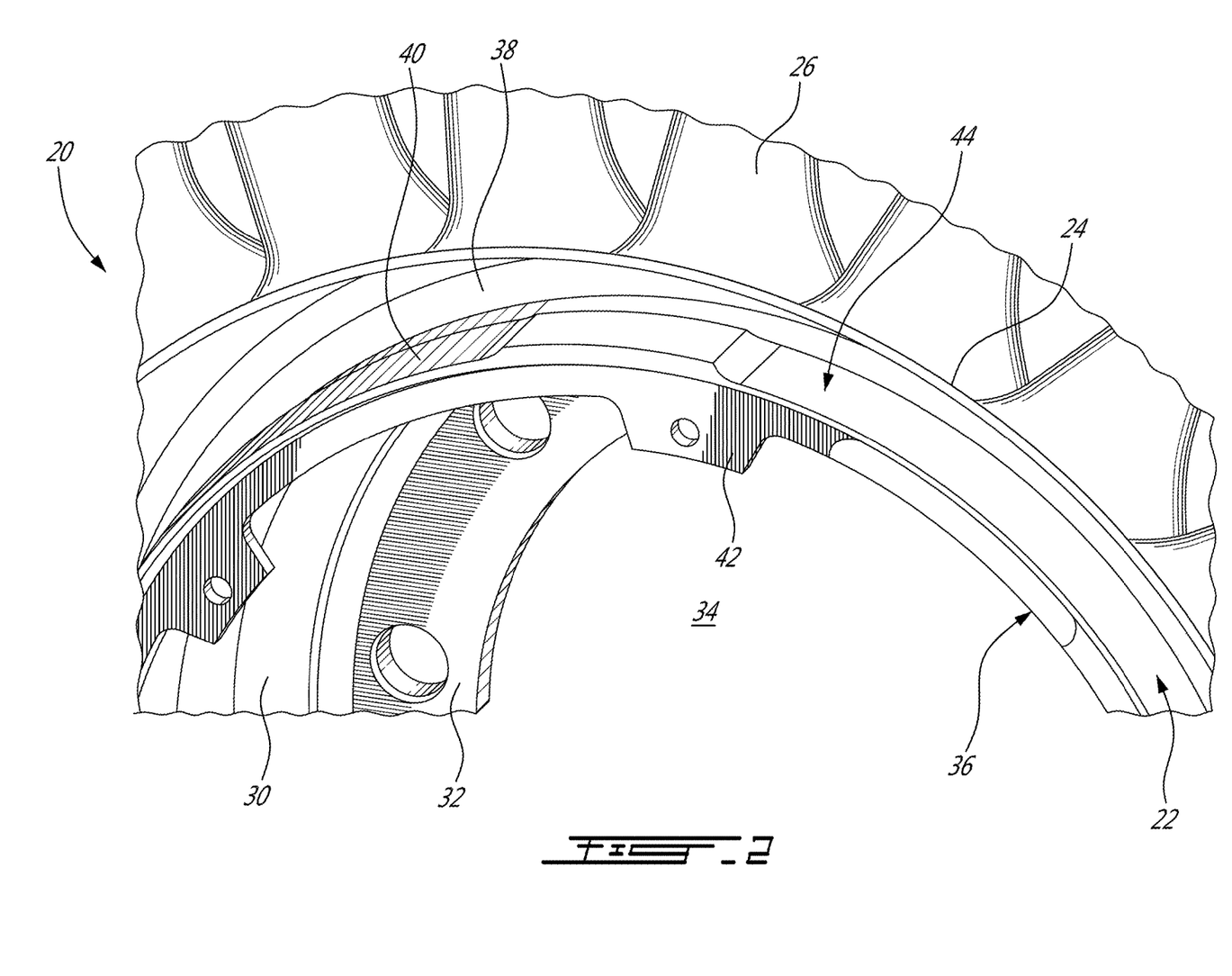
FIG. 2 is a schematic tridimensional view of a fan rotor in accordance with a particular embodiment, which can be used in a gas turbine engine such as shown in FIG. 1.

FIG. 2 illustrates part of a fan rotor 20 generally comprising a disc 22 having an axisymmetric peripheral annular rim 24, and a set of circumferentially spaced-apart blades 26 projecting radially outwardly from a radially outer surface of the rim 24. According to the illustrated embodiment, the blades 26 and the disc 22 are integrally connected to form a one-piece component. In a particular embodiment, the rotor 20 is manufactured from a forged blank of high strength material, such as titanium, and is then suitably machined (or other material removal process) to its final dimensions by appropriate means, such as a high precision multi-axis milling machine. Alternatively, the blades 26 may be welded or otherwise attached to the disc 22. The blades 26 may alternately be detachably connected to the disc 22, for example detachably mounted in slots defined in the rim 24. The disc 22 has a web 30 extending radially inwardly from the rim 24 to an inner hub 32 defining a central bore 34 for receiving a shaft in order to mount the disc 22 for rotation about the centerline axis 11 of the engine 10. An axial length of the rim 24 is selected to offer support to the blades 26 from the leading to the trailing edges thereof.

The rotor 20 includes an annular arm 36 extending from the disk 22, for example having a first annular section 38 extending radially inwardly from the rim 24, and a second annular section 40 extending axially forwardly from the first annular section 38, such that the annular arm 36 has an "L" shaped cross section. Other configurations are also possible. The free end of the second annular section 40 includes a plurality of circumferentially spaced apart connection members 42, for example tabs each having a fastener-receiving hole defined therethrough, for connection with a nosecone 8 (FIG. 1) of the engine 10.

In the embodiment shown, the second annular section 40 of the arm 36 defines an annular balancing flange 44 of the engine 10 (shown in FIG. 2 after machining for balancing, as will be described below). In a particular embodiment, the annular arm 36 for nosecone attachment is a low area of stress well suited for the position of the balancing flange 44. Alternately, the balancing flange 44 may be defined as part of another member of the rotor 20, for example on an inner surface of the rim 24, or as a separate element connected to the rotor disc. 22 The balancing flange 44 is integrally connected to the disc 22, either by being formed therewith in a monolithic manner (e.g. machining, forming, casting) or by being attached thereto in a non-removable manner, for example by welding or brazing. Accordingly, the balancing flange 44 has a fixed circumferential position with respect to the elements of the rotor 20.

After having been machined to its final dimensions, the rotor 20 may be subject to a surface inspection and to a surface treatment operation. For instance, the rotor 20, including the balancing flange, may be blue etch inspected and peened.

The rotor 20 in its final dimensions (in particular embodiment, after surface inspection and/or surface treatment operation(s)) is tested to measure its unbalance. The balancing flange 44 is then machined to create an unbalance correction correcting at least part of the measured unbalance.

In a particular embodiment, the measured unbalance is a static unbalance of the rotor 20, for example an unbalance measured in a stationary assembly assessing weight distribution around the circumference without consideration of the weight distribution along the axial direction. In another particular embodiment, the measured unbalance is a dynamic unbalance, for example an unbalance measured in a rotational assembly assessing the relative position and orientation of the inertia axis (center of mass axis) and the rotational axis (geometrical axis) of the rotor.

According to a prior method, the unbalance correction necessary to correct part of the unbalance (when used in combination with one or more other balancing element(s)) or the unbalance correction necessary to correct the entire unbalance (when used as the sole unbalance correction) was determined, and then a notch was machined in the balancing flange, typically spanning an arc angle of 150 degrees or less, to provide for this unbalance correction. Variations in potential unbalance corrections that may be required between different rotors having the same nominal dimensions necessitated for a relatively large balancing flange to be provided, to ensure that the balancing flange included sufficient material to be able to machine the required balancing notch for at least a majority of the rotors. Rotors with a small unbalance thus suffered from a weight penalty due to the presence of the oversized balancing flange. Maximum flange dimensions had to be determined based on an acceptable weight penalty for rotors having a small unbalance. Accordingly, in some instances rotors having an unbalance that would require a greater notch than possible in the maximum flange dimensions could not be corrected through this method.

By contrast, in a particular embodiment, the unbalance of the rotor 20 is corrected in accordance with the following. The unbalance (static or dynamic) is measured, and the unbalance correction necessary to correct at least part of the unbalance is determined. In a particular embodiment, this unbalance correction is determined such as to correct the entirety of the measured unbalance. In another embodiment, for example with the measured unbalance being a dynamic unbalance, this unbalance correction is determined to correct a part of the measured unbalance in the plane of the balancing flange 44, in consideration that other balancing element(s) will be provided on a second plane parallel to the plane of the balancing flange 44 (e.g. on the other side of the blades 26) to provide a complementary unbalance correction allowing the machined balancing flange 44 and the other balancing element(s) to together correct the measured unbalance. The other balancing element(s) may include a second balancing flange also machined as per the present method or as per any other adequate method (e.g. prior method of machining a notch described above), one or more balancing weights added in the second plane, etc.

Then, the configuration of a theoretical notch that would create the unbalance correction to be provided by the balancing flange 44, if it was machined into the balancing flange 44, is determined. This theoretical notch corresponds to the notch in the above described prior method. The notch is however not machined in the balancing flange in the present method.

Figure 3A:
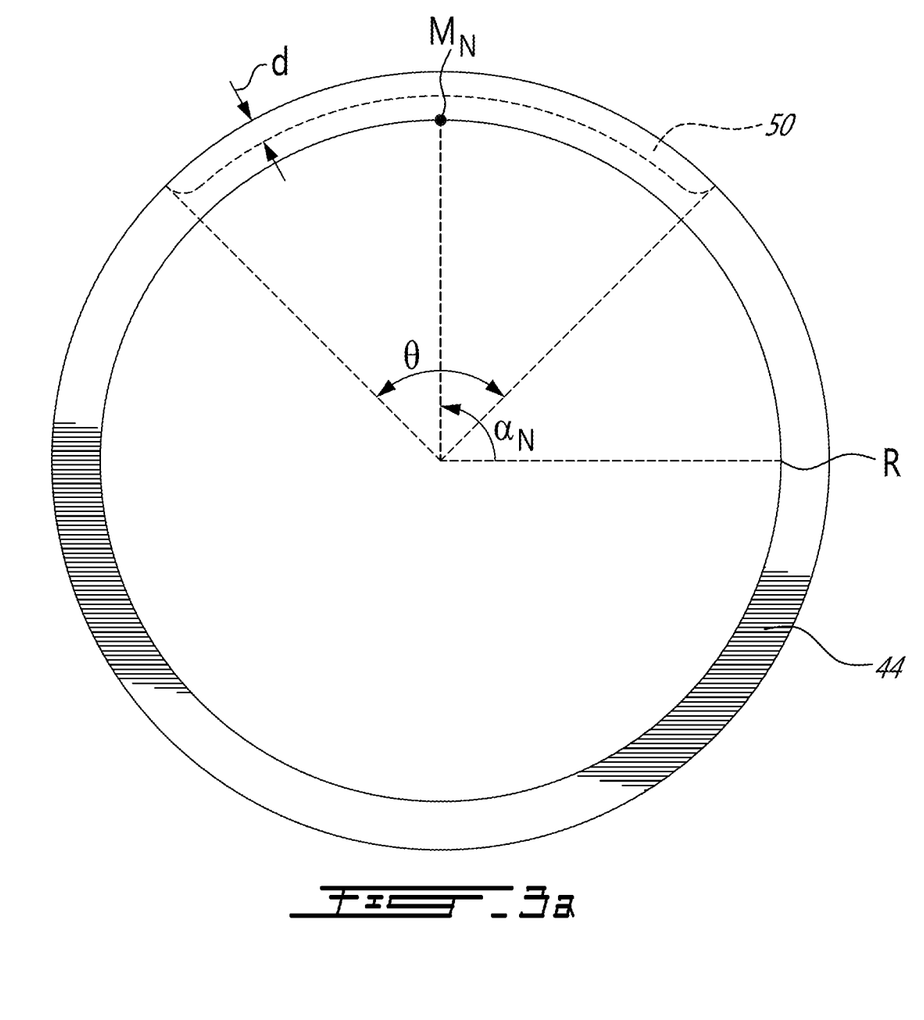
FIG. 3a is a schematic front view of a balancing flange of the rotor of FIG. 2 in accordance with a particular embodiment, prior to machining.

Referring to FIG. 3a, where the balancing flange 44 is shown in isolation for improved clarity with the understanding that it remains integrally connected to the disc 22 which is not shown, it can be seen that the configuration of the theoretical notch 50 includes its depth d, defined along the radial direction; its arc angle $\theta$ spanning its circumferential width; and its circumferential position, for example defined by an angle $\alpha_N$ between a predetermined reference point R and the mid-point $M_N$ of the circumferential width. Other positional markers may alternately be used for the circumferential position; the circumferential position may for example be defined as a clock position of the mid-point $M_N$ relative to the predetermined reference point R. In the example of FIG. 3a, the theoretical notch spans an arc angle θ of approximately 90 degrees, and has a circumferential position defined by an angle $\alpha_N$ of approximately 90 degrees from the reference point R as measured in a counter-clockwise direction (+90 degrees). Taking the reference point R as the 12 o'clock position, the circumferential position of the example theoretical notch of FIG. 3a can alternately be described as corresponding approximately to the 9 o'clock position.

Figure 3B:
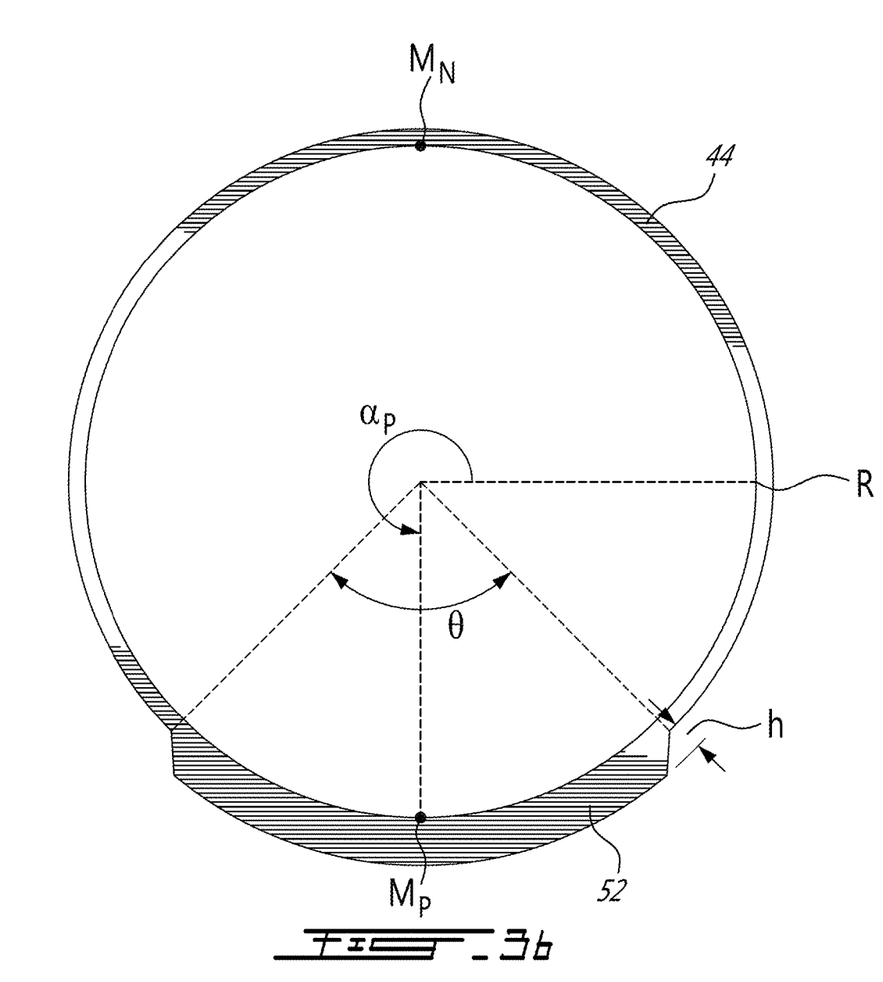
FIG. 3b is a schematic front view of the balancing flange of FIG. 3a, after machining in accordance with a particular embodiment.

Referring to FIG. 3b, instead of machining the balancing flange 44 to produce the theoretical notch 50, the balancing flange 44 is machined to create an opposed protuberance 52 which will produce an unbalance correction equivalent to that which would have been provided by the theoretical notch 50. Material is thus removed from the balancing flange 44 to create this protuberance 52, which protruding radially relative to the remainder of the balancing flange 44. The height h of the protuberance 52, defined along the radial direction between the outer surface of the protuberance 52 and the outer surface of the balancing flange 44 adjacent the protuberance 52, has the same value as the depth d of the theoretical notch 50. The arc angle θ spanning the circumferential width of the protuberance 52 has the same value as the arc angle θ of the theoretical notch 50. The circumferential position of the protuberance 52 is diametrically opposed to that of the theoretical notch 50, i.e. the mid-point $M_P$ of the circumferential width of the protuberance 52 is diametrically opposed to the mid-point $M_N$ of the circumferential width of the theoretical notch 50. As such, there is a difference of 180 degrees between the angle $\alpha_N$ of the circumferential position of the theoretical notch 50 and the angle $\alpha_P$ of the circumferential position of the protuberance 52 (defined between the reference point R and the mid-point $M_P$). In the example shown in FIG. 3b corresponding to the example of theoretical notch 50 of FIG. 3a, the protuberance 52 thus spans an arc angle θ of approximately 90 degrees, and has a circumferential position defined by an angle $\alpha_P$ of approximately 270 degrees from the reference point R (or −90 degrees as measured in the counter-clockwise direction). The example protuberance 52 of FIG. 3b can alternately be described as being positioned approximately at 3 o'clock. The height h, arc angle θ and circumferential position angle $\alpha_P$ of the protuberance 52 are thus parameters which will vary between different rotors 20 made to the same nominal dimensions, providing a customized unbalance correction to each rotor 20 depending on its measured unbalance.

The balancing flange 44 is thus machined to remove material at least around an angle of 360 degrees minus the arc angle θ instead of only around the arc angle as per the prior method of machining a notch. The arc angle θ is lower than 180 degrees, and as such the angular portion of the balancing flange 44 removed in creating the protuberance 52 is larger than the angular portion that would have been removed to create the theoretical notch 50, allowing for a smaller weight penalty for a same unbalance correction.

In a particular embodiment, the arc angle is at most 150 degrees. In a particular embodiment, the arc angle θ is at least 15 degrees and at most 150 degrees. In a particular embodiment, the arc angle θ is at most 120 degrees.

In a particular embodiment, the balancing flange 44 is machined only along its angular portion outside of the protuberance 52, i.e. the balancing flange 44 is not machined in its angular portion defining the protuberance 52. In another particular embodiment, the balancing flange 44 is machined around its entire circumference to axisymmetrically remove an annular portion exceeding that required to define the protuberance 52 before creating the protuberance 52. The annular portion of material removed during the axisymmetric machining step may represent all or a part of the excess material. The balancing flange 44 is then further machined to non-axisymmetrically remove material in the angular portion outside of the protuberance 52, until the protuberance 52 is defined at its height h. In a particular embodiment, the balancing flange 44 is machined such that the element incorporating the balancing flange 44 (here, the arm 36 for connection to the nosecone 8) has a radial dimension outside of the protuberance 52 corresponding to its minimum radial dimension, the minimum radial dimension being determined taking into account for example structural characteristics of that element. The minimum radial dimension may include a provision for further balancing corrections, for example following repairs.

In a particular embodiment, the rotor unbalance may be measured again after machining of the balancing flange 44, and corrections may be applied if required through further machining.

The balancing flange 44 can thus be provided with dimensions large enough to accommodate even the rotors having the worst unbalance without additional weight penalty for the rotors requiring only a small unbalance correction, since the extra material allotted for the rotors with the worst unbalance may be removed for the rotors with smaller unbalances. Accordingly, in a particular embodiment, a larger balancing flange 44 can be provided as compared to the prior method of machining a notch, which in a particular embodiment reduces the number of rotors having an unbalance too large to be corrected.

Figure 4:
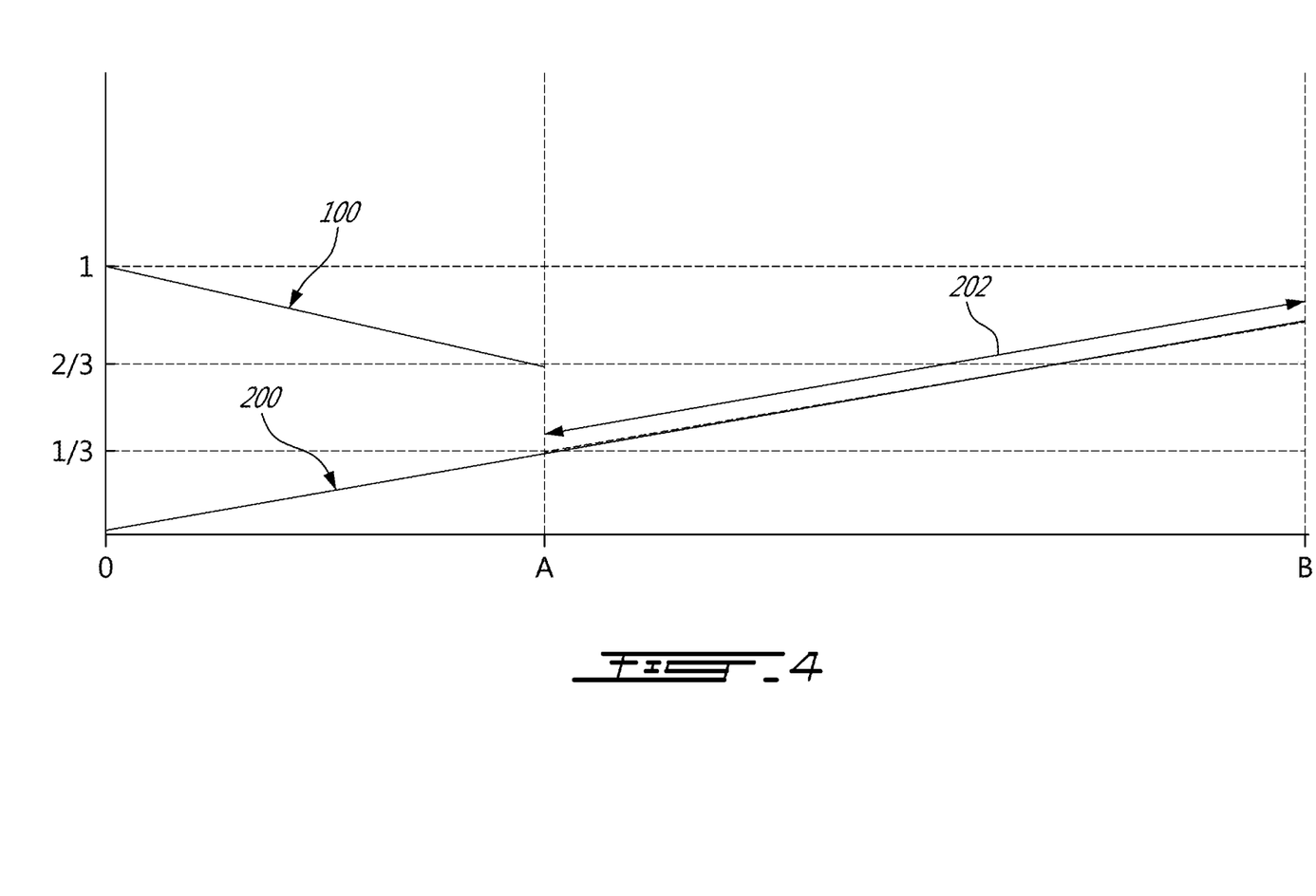
FIG. 4 is a graph of the unbalance correction as a function of the non-dimensional weight of the balancing flange after machining, for a balancing flange machined such as in FIG. 3b and for a balancing flange machined in accordance with a prior method.

FIG. 4 shows an example of a comparison between possible unbalance corrections with the prior method of machining a notch and with the present method of machining a protuberance, for a particular rotor, considering a same maximum arc angle θ for both methods, and according to a particular embodiment. The curves show the unbalance correction as a function of the non-dimensional weight of the balancing flange after machining.

Curve 100 corresponds to the prior method of machining a notch. Rotors with the smallest corrections have the highest final weight for the balancing flange, since only a small portion of the balancing flange is removed to provide the unbalance correction. The graph shows a maximum required unbalance correction that can be provided (i.e. largest unbalance that can be corrected) as value "A", which corresponds to the machining of the largest possible notch in the balancing flange. Unbalance corrections greater than this value "A" cannot be corrected through this method and accordingly the curve 100 does not extend beyond the value "A".

Curve 200 corresponds to the present method of machining the protuberance 52. Rotors with the smallest corrections have the smallest final weight for the balancing flange 44, because the protuberance 52 required to provide the unbalance correction is small and accordingly most of the balancing flange 44 is removed. The final weight of the balancing flange 44 remains smaller for the present method 200 when compared to the prior method 100 for a same unbalance correction. At the limit value "A" of the prior method 100, unbalance correction is still possible with the present method 200. Correction is still possible up to a limit value "B", which corresponds to the machining of the largest possible protuberance 52 in the balancing flange 44. Value "B" is significantly higher than value "A" because the balancing flange 44 before machining as per the present method 200 can be significantly larger than the balancing flange before machining as per the prior method 100, since the extra material is removed when not required to avoid unnecessary weight penalties. Accordingly, in a particular embodiment, the present method 200 provides for additional balance capacity 202 as compared with the prior method 100 of machining a notch without additional weight penalty to the rotors having a small unbalance. In a particular embodiment, the balancing flange 44 before machining as per the present method 200 has a radial dimension (thickness) of up to 3 times that of the balancing flange before machining as per the prior method 100 of machining a notch.

Figure 5A:
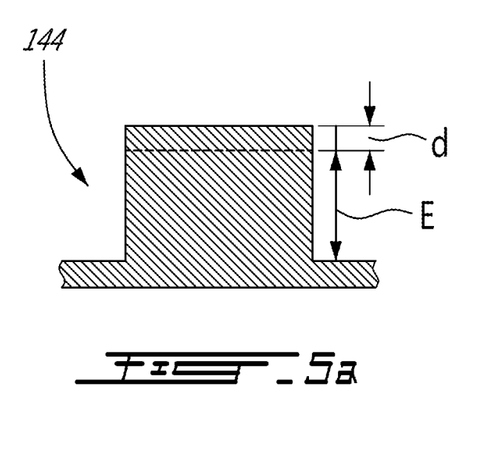
FIG. 5a is a schematic cross-sectional view of part of a balancing flange of the rotor of FIG. 2 in accordance with another particular embodiment, prior to machining.
Figure 5B:
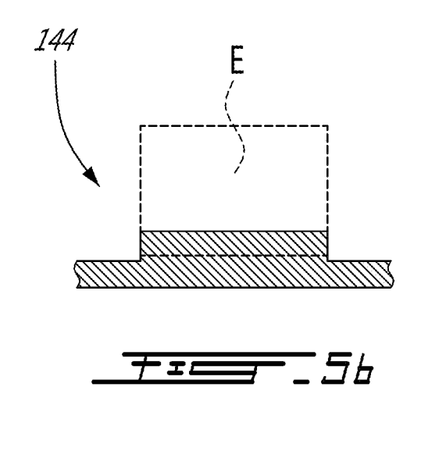
FIG. 5b is a schematic cross-sectional view of the part of the balancing flange of FIG. 5a, after a step of axisymmetric machining in accordance with a particular embodiment.
Figure 5C:
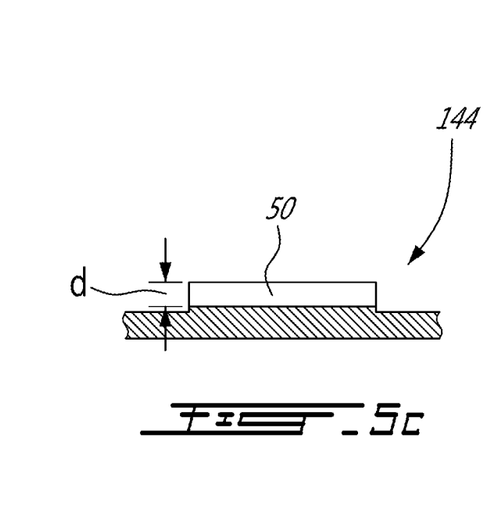
FIG. 5c is a schematic cross-sectional view of the part of the balancing flange of FIG. 5b, after a further step of non-axisymmetric machining in accordance with a particular embodiment.

Referring to FIG. 5*a*-5*c*, in another embodiment, the balancing flange 144 is machined by machining the theoretical notch 50 such as that shown in FIG. 3*a*, but only after an axisymmetric machining of the balancing flange 144 has been performed such as to minimize the weight penalty.

The unbalance of the rotor 20 is thus measured, and the unbalance correction necessary to correct at least part of the unbalance is determined. In a particular embodiment, this unbalance correction is determined such as to correct the entirety of the measured unbalance. In another embodiment this unbalance correction is determined to correct a part of the measured unbalance in the plane of the balancing flange 144, in consideration that other balancing element(s) will be provided on a second plane parallel to plane of the balancing flange to provide complementary correction, as detailed above.

Referring to FIG. 5*a*, the portion E of the balancing flange 144 exceeding that required to provide for the unbalance correction is determined (for example by determining the depth d of the notch to be machined). Referring to FIG. 5*b*, the balancing flange 144 is then machined to axisymmetrically remove part or this entire excess portion E, for example through radial machining to remove an outer annular portion of the balancing flange 144. Since the material is axisymmetrically removed, balance is not affected. Referring to FIG. 5*c*, the notch 50 having the characteristics of the theoretical notch is then machined through non-axisymmetric material removal in the remaining portion of the balancing flange 144, such as to create the unbalance correction.

In a particular embodiment, the balancing flange 144 is machined such that the element incorporating the balancing flange 144 (here, the arm 36 for connection to the nosecone 8) has a radial dimension inside the notch 50 corresponding to its minimum radial dimension, the minimum radial dimension being determined taking into account for example structural characteristics of that element. The minimum radial dimension may include a provision for further balancing corrections, for example following repairs.

In a particular embodiment, the rotor unbalance may be measured again after machining of the balancing flange 144, and corrections may be applied if required through further machining.

Figure 6:
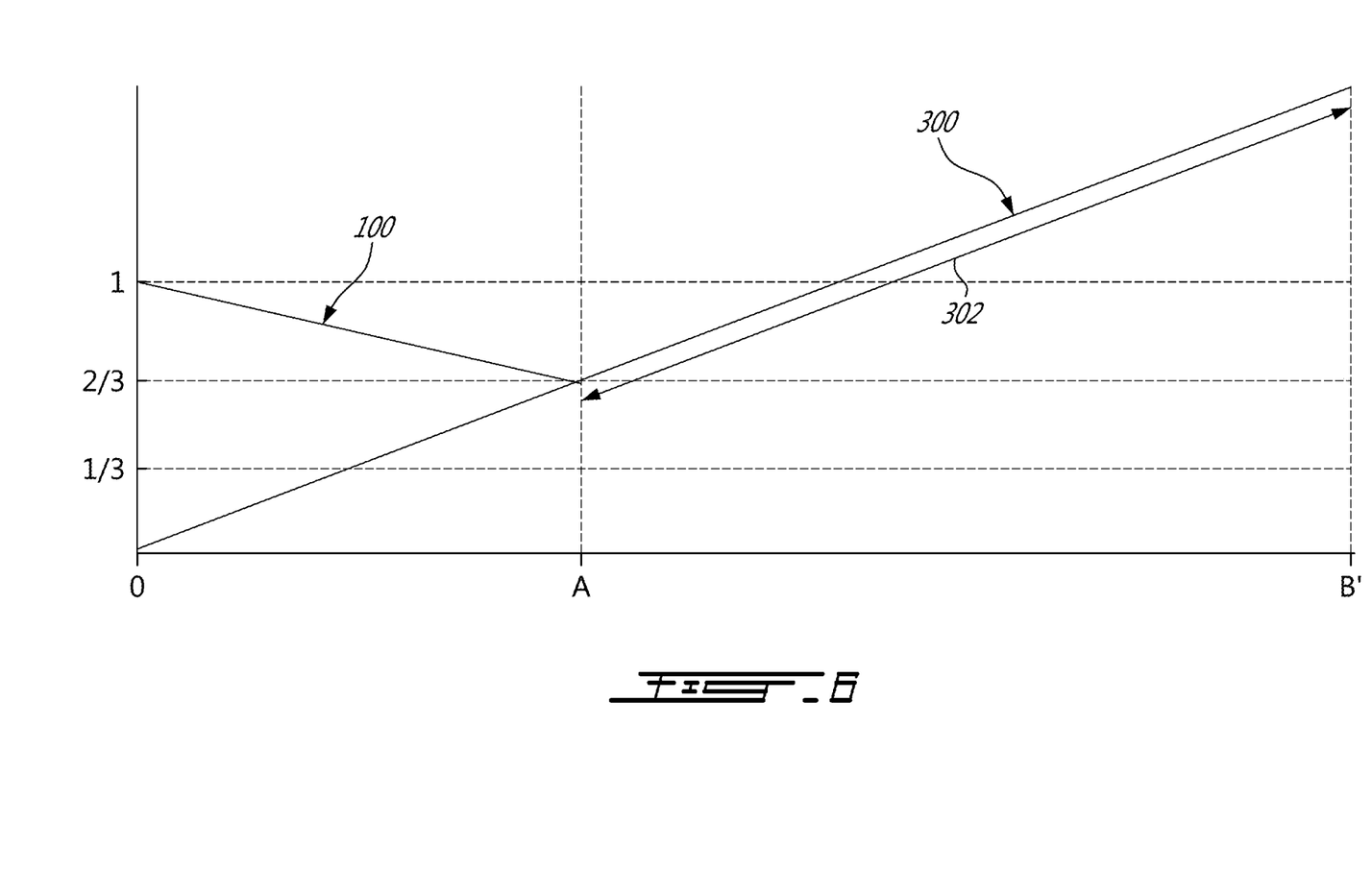
FIG. 6 is a graph of the unbalance correction as a function of the non-dimensional weight of the balancing flange after machining, for a balancing flange machined such as in FIG. 5b-5c and for a balancing flange machined in accordance with the prior method.

FIG. 6 shows an example of a comparison between possible unbalance corrections with the prior method of machining a notch and with the present method of axisymmetric machining followed by machining the notch, for a particular rotor, considering a same maximum arc angle θ for both methods, and according to a particular embodiment. The curves show the unbalance correction as a function of the non-dimensional weight of the balancing flange after machining. Curve 100 is the same as that shown in FIG. 4 and previously described and as such will not be further described herein.

Curve 300 corresponds to the present method of axisymmetric machining followed by machining the notch. Rotors with the smallest corrections have the smallest final weight for the balancing flange 144, since most of the balancing flange 144 is removed prior to machining the notch. The final weight of the balancing flange 144 remains smaller for the present method 300 as compared to the prior method 100, for a same unbalance correction. At the limit value "A" of the prior method 100, unbalance correction is still possible with the present method 300. Correction is still possible up to a limit value "B", which corresponds to the machining of the largest possible notch 50 in the balancing flange 144, i.e. with minimal or no prior axisymmetric machining. Value "B" is significantly higher than value "A" because the balancing flange 144 before machining as per the present method 300 can be significantly larger than the balancing flange before machining of the prior method 100, since the extra material is removed when not required to avoid unnecessary weight penalties. Accordingly, in a particular embodiment, the present method 300 provides for additional balance capacity 302 as compared with the prior method 100 of machining only the notch, while reducing the weight penalty to the rotors having a small unbalance. In a particular embodiment, the balancing flange 144 before machining as per the present method 300 has a radial dimension (thickness) of up to 3 times that of the balancing flange before machining of the prior method 100 of machining only the notch.

Figure 7A:
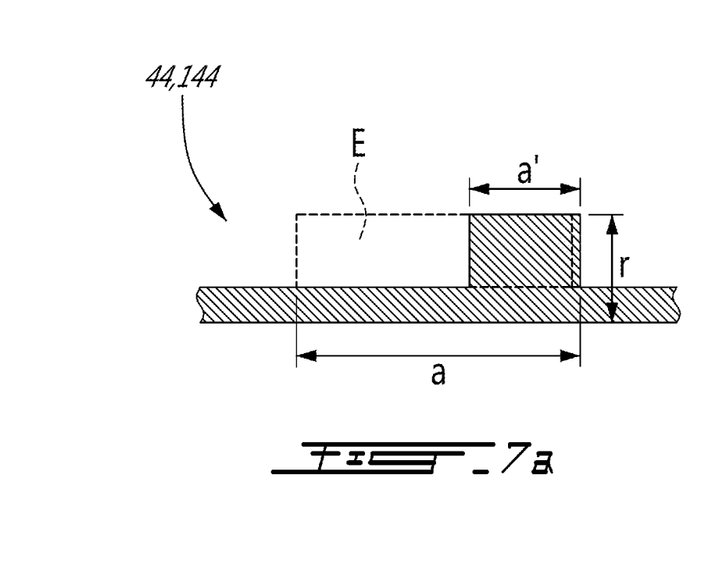
FIGS. 7a-7b are schematic cross-sectional views of part of a balancing flange of the rotor of FIG. 2, showing different configurations of axisymmetric and non-axisymmetric machining in accordance with different embodiments.
Figure 7B:
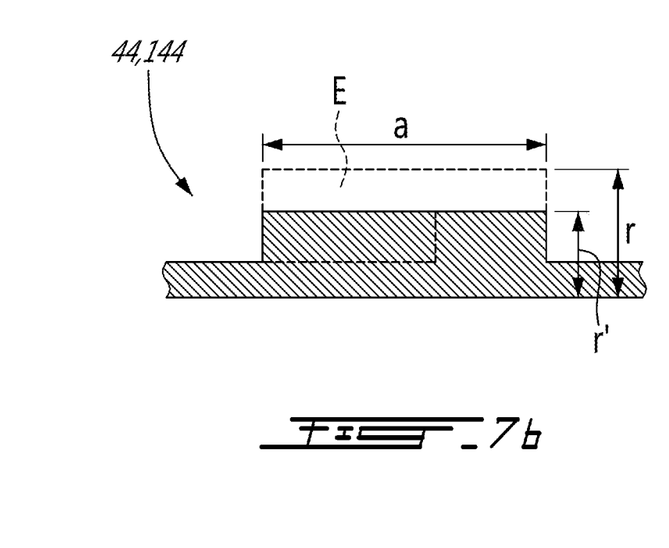

FIGS. 7*a* and 7*b* illustrate different examples of axisymmetric machining which can be used in method 200 prior to machining the protuberance 52, or in method 300 prior to machining the notch 50. Referring to FIG. 7*a*, the axisymmetric material removal may be performed axially, removing a front or rear annular portion of the balancing flange 44, 144 along only part of the axial dimension a of the balancing flange. The balancing flange after the axisymmetric material removal thus has a reduced axial dimension a' while retaining its initial radial dimension r. The notch or protuberance 50, 52 is machined in the remaining material, through further axial machining to further reduce the axial dimension in the notch 50 or in the portion of the circumference not defining the protuberance 52 (as shown in dotted lines), through radial machining to reduce the radial dimension in the notch 50 or in the portion of the circumference not defining the protuberance 52 (as shown for example in FIG. 5*c*), or through a combination of both, for example defining a stepped profile in the remaining portions of the balancing flange 44, 144.

Referring to FIG. 7*b*, the axisymmetric material removal may be performed radially, removing an outer annular portion of the balancing flange 44, 144. The balancing flange 44, 144 after the axisymmetric material removal thus has a reduced radial dimension r' while retaining its initial axial dimension a. The notch or protuberance 50, 52 is machined in the remaining material, through axial machining to reduce the axial dimension in the notch 50 or in the portion of the circumference not defining the protuberance 52 (as shown in dotted lines), through radial machining to reduce the radial dimension in the notch 50 or in the portion of the circumference not defining the protuberance 52 (as shown for example in FIG. 5*c*), or through a combination of both, for example defining a stepped profile in the remaining portions of the balancing flange 44, 144.

The above description is meant to be exemplary only, and one skilled in the art will recognize that changes may be made to the embodiments described without departing from the scope of the invention disclosed. For example, the method can be applied to any other appropriate rotational component, including other rotors of the gas turbine engine. Still other modifications which fall within the scope of the present invention will be apparent to those skilled in the art, in light of a review of this disclosure, and such modifications are intended to fall within the appended claims.

The invention claimed is:

1. A gas turbine engine rotor comprising a disc adapted to be mounted for rotation about an axis, the disc defining a peripheral annular rim and including an annular balancing flange integrally connected thereto, the balancing flange having a first thickness over a first arc angle and a second thickness over a second arc angle, the first and second thicknesses taken in a radial direction relative to the rotor, the second thickness being greater than the first thickness, the second arc angle corresponding to 360 degrees minus the first arc angle, the second arc angle being less than 180 degrees, the balancing flange around the second arc angle defining a protuberance, the protuberance protruding radially outwardly from a remainder of the annular balancing flange and forming part of a radially outward side of the annular balancing flange, the protuberance being defined through machining of the balancing flange, the protuberance compensating for an unbalance of the rotor.

2. The rotor as defined in claim 1, wherein the disc includes an annular arm extending inwardly from the peripheral annular rim and the balancing flange is integral with the annular arm of the disc such as to form a monolithic piece therewith.

3. The rotor as defined in claim 2, wherein the rotor is a fan rotor and the annular arm includes connection members configured for engaging a nosecone of the engine.

4. The rotor as defined in claim 2, wherein the annular arm has a first annular section extending radially inwardly from the peripheral annular rim and a second annular section extending axially forwardly from the first annular section such that the annular arm has an L-shaped cross-section when viewed in a plane coextensive with a longitudinal axis of the rotor.

5. The rotor as defined in claim 1, wherein the second arc angle is at least 15 degrees.

6. The rotor as defined in claim 1, wherein the second arc angle is at most 150 degrees.

7. The rotor as defined in claim 1, wherein the second arc angle is at most 120 degrees.

8. The rotor as defined in claim 1, wherein the balancing flange and the disc are integral in a monolithic manner.

9. The rotor as defined in claim 4, wherein the balancing flange forms part of the second annular section of the annular arm.

10. A gas turbine engine rotor comprising a disc adapted to be mounted for rotation about an axis, the disc defining a peripheral annular rim and an annular arm extending inwardly from the peripheral annular rim, the peripheral annular rim having a first annular section extending radially inwardly from the peripheral annular rim and a second annular section extending axially from the first annular section such that the second annular section extends transversally to the first annular section and the second annular section is radially inwardly offset relative to the peripheral annular rim, the second annular section including an annular balancing flange permanently connected thereto, the annular balancing flange defining a protuberance protruding radially from the second annular section toward the peripheral annular rim, the protuberance extending continuously over an arc angle corresponding to less than 180 degrees.

11. The rotor as defined in claim 10, wherein the annular balancing flange is formed integral with the second annular section such that the annular arm and the annular balancing flange form a monolithic piece.

12. The rotor as defined in claim 10, wherein a free end of the second annular section includes a plurality of circumferentially spaced apart connection members for connection with a nosecone.

* * * * *